United States Patent
Findley et al.

(10) Patent No.: US 6,454,030 B1
(45) Date of Patent: Sep. 24, 2002

(54) DRILL BITS AND OTHER ARTICLES OF MANUFACTURE INCLUDING A LAYER-MANUFACTURED SHELL INTEGRALLY SECURED TO A CAST STRUCTURE AND METHODS OF FABRICATING SAME

(75) Inventors: Sidney L. Findley, West Valley City; Trent N. Butcher, Sandy; Gordon A. Tibbits, Salt Lake City, all of UT (US)

(73) Assignee: Baker Hughes Incorporated, Houston, TX (US)

(*) Notice: Subject to any disclaimer, the term of this patent is extended or adjusted under 35 U.S.C. 154(b) by 6 days.

(21) Appl. No.: 09/236,971

(22) Filed: Jan. 25, 1999

(51) Int. Cl.$^7$ ............................................. E21B 10/02
(52) U.S. Cl. ..................................... 175/425; 76/108.2
(58) Field of Search ............................... 175/425, 374; 76/108.2, 108.1

(56) References Cited

U.S. PATENT DOCUMENTS

| | | | |
|---|---|---|---|
| 3,471,921 A | 10/1969 | Feenstra et al. | |
| 3,757,878 A | 9/1973 | Wilder et al. | |
| 3,757,879 A | 9/1973 | Wilder et al. | |
| 3,986,546 A | 10/1976 | Green et al. | |
| 4,064,926 A | 12/1977 | Naegele | |
| 4,173,457 A | * 11/1979 | Smith ........................... | 175/425 |

(List continued on next page.)

FOREIGN PATENT DOCUMENTS

| | | |
|---|---|---|
| DE | 33 47 501 A1 | 5/1985 |
| EP | 0 096 591 | 12/1983 |
| EP | 0 145 421 | 6/1985 |
| GB | 1 572 543 | 7/1980 |
| GB | 2 230 981 | 11/1990 |
| GB | 2238736 A | 6/1991 |
| GB | 2 287 959 | 10/1995 |
| GB | 2 296 673 | 7/1996 |
| GB | 2345930 | * 7/2000 |
| WO | WO 90/03893 | 4/1990 |
| WO | WO 92/08592 | 5/1992 |
| WO | 98/13159 | * 4/1998 |
| WO | 98/13317 | * 4/1998 |

OTHER PUBLICATIONS

Author unknown, "Models in Minutes—and At Your Desk", *Machine Design*, pp. 20 & 23, Oct. 22, 1993.
Author unknown, "Rapid Mold Maker Promise Faster Metal Prototypes", *Machine Design*, Nov. 26, 1992.
Author unknown, "Protech Engineer Applies Finishing Touch to Stereolithography", pp. 36 & 37, undated.

(List continued on next page.)

*Primary Examiner*—Thomas B. Will
*Assistant Examiner*—Nathan Mammen
(74) *Attorney, Agent, or Firm*—Trask Britt

(57) ABSTRACT

A rotary-type earth-boring drill bit including a layer-manufactured, substantially hollow bit crown and an integral bit interior and bit gage. The bit interior and bit gage may be formed of a particulate material infiltrated with an infiltrant material. A particulate material of the bit crown may be integrally infiltrated with the particulate material of the bit interior and bit gage. Alternatively, the bit interior and bit gage may comprise a single cast material. The particulate material of the bit crown may be infiltrated with the cast material of the bit interior and bit gage. A method of fabricating the drill bit includes employing known layered-manufacturing techniques to fabricate the bit crown, positioning a bit gage mold adjacent the bit crown, and disposing a core material within an interior of the bit crown and a cavity of the bit gage mold. A mold that may be employed to fabricate the drill bit includes an initially conforming mold region, in which the pre-fabricated bit crown may be disposed, and a second, substantially rigid mold region including a cavity to define the gage of the drill bit. Preferably, the conforming mold region is formed of a non-wettable, granular material.

34 Claims, 10 Drawing Sheets

U.S. PATENT DOCUMENTS

| | | |
|---|---|---|
| 4,398,952 A | 8/1983 | Drake |
| 4,414,028 A | 11/1983 | Inoue |
| 4,423,646 A | 1/1984 | Bernhardt |
| 4,484,644 A | 11/1984 | Cook et al. |
| 4,499,795 A | 2/1985 | Radtke |
| 4,694,919 A | 9/1987 | Barr |
| 4,702,304 A | 10/1987 | Rice |
| 4,863,538 A | 9/1989 | Deckard |
| 4,884,477 A | 12/1989 | Smith et al. |
| 4,919,013 A | 4/1990 | Smith et al. |
| 5,000,273 A | 3/1991 | Horton et al. |
| 5,017,753 A | 5/1991 | Deckard |
| 5,090,491 A | 2/1992 | Tibbitts et al. |
| 5,101,692 A | 4/1992 | Simpson |
| 5,132,143 A | 7/1992 | Deckard |
| 5,155,321 A | 10/1992 | Grube et al. |
| 5,155,324 A | 10/1992 | Deckard et al. |
| 5,156,697 A | 10/1992 | Bourell et al. |
| 5,182,170 A | 1/1993 | Marcus et al. |
| 5,252,164 A | 10/1993 | Forderhase et al. |
| 5,284,695 A | 2/1994 | Barlow et al. |
| 5,304,329 A | 4/1994 | Dickens, Jr. et al. |
| 5,316,580 A | 5/1994 | Deckard |
| 5,332,051 A | 7/1994 | Knowlton |
| 5,342,919 A | 8/1994 | Dickens, Jr. et al. |
| 5,352,405 A | 10/1994 | Beaman et al. |
| 5,373,907 A | 12/1994 | Weaver |
| 5,385,780 A | 1/1995 | Lee |
| 5,433,280 A | 7/1995 | Smith |
| 5,441,121 A | 8/1995 | Tibbitts |
| 5,453,241 A | 9/1995 | Akerman et al. |
| 5,511,603 A | 4/1996 | Brown et al. |
| 5,544,550 A | 8/1996 | Smith |
| 5,544,713 A * | 8/1996 | Dennis ...................... 76/108.2 |
| 5,618,484 A | 4/1997 | Mogensen et al. |
| 5,632,326 A | 5/1997 | Gough |
| 5,641,015 A | 6/1997 | Challand |
| 5,658,412 A | 8/1997 | Retallick et al. |
| 5,663,883 A | 9/1997 | Thomas et al. |
| 5,732,783 A | 3/1998 | Truax et al. |
| 5,839,329 A * | 11/1998 | Smith et al. ............... 76/108.2 |
| 5,957,006 A * | 9/1999 | Smith ........................ 76/108.2 |
| 5,967,248 A * | 10/1999 | Drake et al. ................ 175/425 |
| 6,029,759 A * | 2/2000 | Sue et al. ................... 175/425 |

OTHER PUBLICATIONS

Dvorak, Paul, "Rapid Prototypes for Production Parts", *Machine Design*, pp. 48–54, Oct. 8, 1993.

Protech Services, Inc. company brochure, undated.

Tait, David, Autofact '93 Conference materials entitled "Cashing in on Rapid Prototyping", Nov. 10, 1993.

Wohlers, Terry, Autofact '93 Conference materials entitled Advancements in Rapid Prototyping, Nov. 10, 1993.

News Release—from Soligen, Inc., entitled Soligen Announces DSPC™ Machine Order by Ashland Chemical, Jul. 14, 1993.

News Release—from Soligen, Inc. entitled "Soligen Demonstrates Fast Production of Casting Molds is Feasible Multiple Jets Used to Greatly Increase Production Speed", Aug. 17, 1993.

News Release—from Soligen, Inc., entitled "Soligen Demonstrates Surface Finish Improvement for Casting Process", Nov. 8, 1993.

Soligen, Inc. brochure entitled "Technology Backgrounder", May 1993.

Soligen, Inc. brochure entitled "If all metal parts were this simple, there would be on need for Direct Shell Production Castings", undated.

Ashley, Steven, "CGI Casting: A New Iron in the Fire", *Mechanical Engineering*, vol. 114/No. 11, pp. 49–51, Nov. 1992.

Uziel, Yehoram, An Unconventional Approach to Producing Investment Casting, *Modern Casting*, Aug. 1993.

Prioleau, Frost, et al., "The Virtual Vision Story", *Pro E The Magazine*, vol. 1, No. 2, pp. 1–4, Fall 1993.

DTMonitor Newsletter, vol. 3, No. 2, Summer 1993.

Teague, Paul E., et al. Prototyping Expands Design's Portfolio, *Design News*, Jun. 21, 1993.

Lom–1015 brochure entitled "The Power of Lom is now within reach", undated.

Stratasys™, Inc. brochure for FDM 1000®, undated.

UK Search Report in Application No. GB 9930843.9.

* cited by examiner

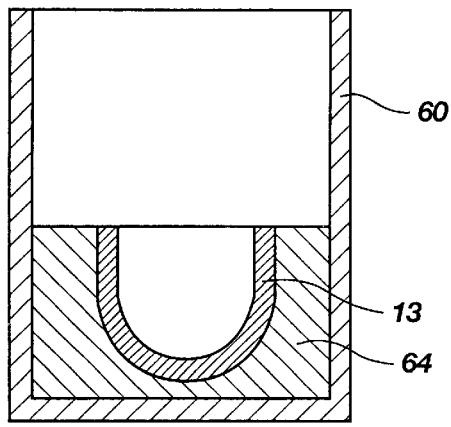
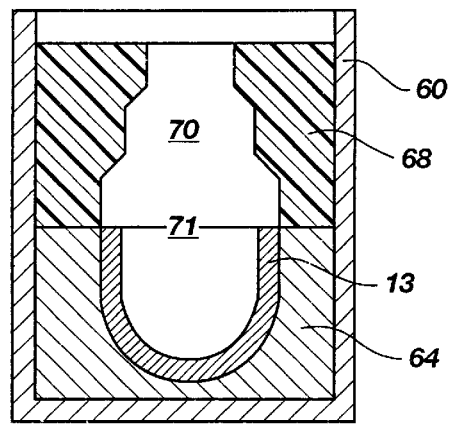
Fig. 7A  Fig. 7B
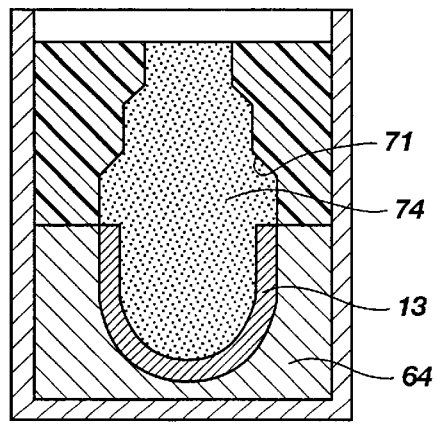
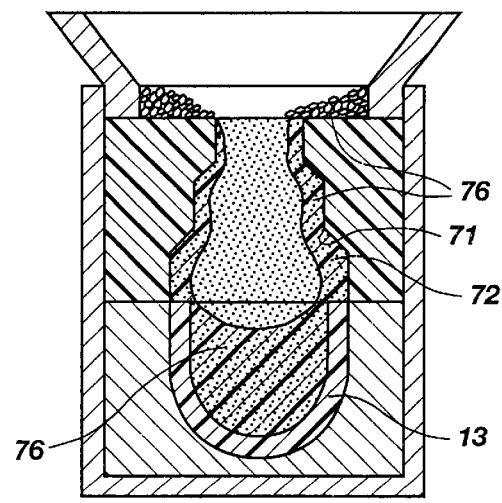
Fig. 7C  Fig. 7D

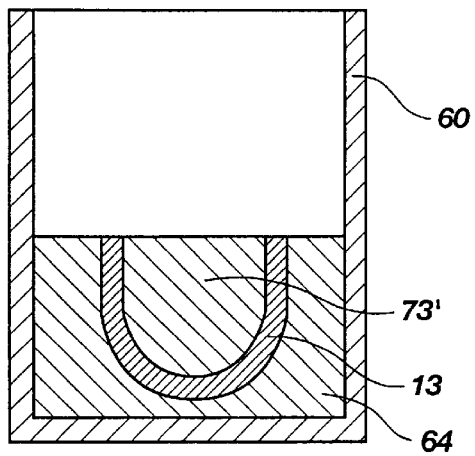
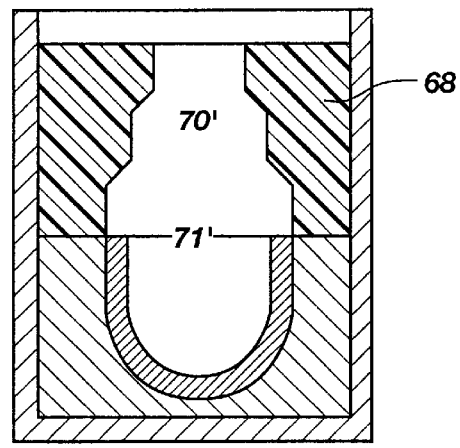
Fig. 8A          Fig. 8B
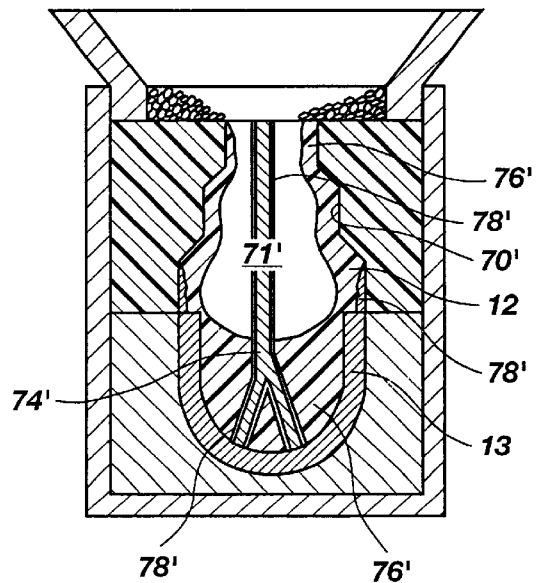
Fig. 8C

DRILL BITS AND OTHER ARTICLES OF MANUFACTURE INCLUDING A LAYER-MANUFACTURED SHELL INTEGRALLY SECURED TO A CAST STRUCTURE AND METHODS OF FABRICATING SAME

BACKGROUND OF THE INVENTION

1. Field of the Invention

The present invention relates to earth-boring drill bits and methods of fabricating such bits and the components thereof. Particularly, the present invention relates to the controlled deposition and affixation of layers of one or more material employed as a matrix material of the bit or bit component, which is also referred to as "layered manufacturing". More particularly, the present invention relates to methods of fabricating a substantially hollow shell of a component of a drill bit, such as a bit crown or other article of manufacture, comprising disposing the substantially hollow shell adjacent a cavity of a mold, disposing a material within the substantially hollow shell and within the cavity of the mold, and infiltrating the shell.

2. Background of Related Art

Earth-boring drill bits that include fixed cutting elements on the face thereof, which are commonly termed rotary drag bits or simply drag bits, typically include a bit body formed of steel or fabricated from an infiltrated matrix of a hard, particulate material, such as tungsten carbide. Particulate-based bit bodies are typically infiltrated with infiltrants, or binder materials, such as copper alloys. The bit body of a drag bit is typically secured to a steel shank. The steel shank typically includes a conventional American Petroleum Institute (API) threaded pin connection by which the drill bit may be secured to the drive shaft of a downhole motor or a drill collar at the distal end of a drill string.

Conventionally, steel bodied bits have been machined from round stock to a desired shape, with topographical features and internal watercourses for delivering drilling fluid to the bit face. Hard-facing may then be applied to the bit face and other critical areas of the surface of the bit, and cutting elements secured to the face of the bit. A shank may be machined and threaded on the drill bit.

In the conventional manufacture of a particulate-based drill bit, a mold, including inserts therefor, is milled or machined to define the exterior surface features of the drill bit. Typically, after a first milling of a block of mold material, such as graphite, to define a mold cavity that will subsequently define larger topographical features of the drill bit, a secondary milling is required to define cutter pockets and side supports therefor on the face of the drill bit. Additional hand milling or clay work may also be required to create or refine topographical features of the drill bit.

Once the mold has been milled or otherwise machined, a preformed bit blank of steel or other suitable material may be disposed within the mold cavity to internally reinforce the bit body matrix upon fabrication of the bit body. Inserts, such as performs that define internal fluid courses, pockets for cutting elements, ridges, lands, nozzle displacements, junk slots, or other topographical features of the bit body, are also inserted into the cavity of the mold. The performs must be individually designed and fabricated, and even minor changes in a drill bit design may necessitate the use of new and different performs. The performs must be placed at precise locations within the mold to ensure the proper placement of cutting elements, nozzles, junk slots, etc.

A quantity of particulate-based material may then be disposed within the cavity of the mold to define a bit body matrix. The bit body matrix is then infiltrated with a molten metal infiltrant to form a solid bit body after solidification of the metal infiltrant and to secure the preformed bit blank to the bit body.

The bit body may then be assembled with other drill bit components. For example, a threaded shank is then welded or otherwise secured to the blank and cutting elements (typically diamond, and most often a synthetic polycrystalline diamond compact or PDC) are secured within the cutting element pockets, such as by brazing, adhesive bonding, or mechanical affixation. Alternatively, the cutting elements may be bonded to the face of the bit body during furnacing and infiltration thereof if thermally stable PDC's, commonly termed TSP's, are employed.

Accordingly, the process of fabricating a particulate-based drill bit is a somewhat timely, costly, and complex process that requires the labor-intensive production of an intermediate product (the mold) before the end product (the bit body) can be cast.

In some cases, the mold fabrication process has been made faster and less costly through the use of rubber displacements, which duplicate, in fine detail, the topography of an entire bit profile and face. These displacements are used to cast a ceramic bit mold having an appropriate interior configuration, from which a bit may be cast. Typically, however, such rubber displacements may only be employed in the fabrication of "standard" bits, which are fixed in design as to the size, number, and placement of cutting elements and as to the size, number, and placement of nozzles. Thus, rubber displacements are only cost-effective for fabricating high-volume drill bits, of which there are relatively few. With frequent advances and changes in bit design, preferences of individual customers for whom bits are fabricated, and the general decline in the number of wells being drilled in recent years, high-volume standard bits have become almost nonexistent.

Layered-manufacturing processes, such as those disclosed in U.S. Pat. No. 5,433,280 (hereinafter "the '280 Patent"), issued to Smith on Jul. 18, 1995, and in U.S. Pat. No. 5,544,550 (hereinafter "the '550 Patent"), issued to Smith on Aug. 13, 1996, both of which are assigned to the assignee of the present invention and incorporated herein in their entireties by this reference for all purposes, were originally intended to reduce the cost and time required to fabricate particulate-based bit bodies.

The '280 and '550 Patents disclose a method of fabricating a bit body, drill bit component, or other article of manufacture in a series of sequentially superimposed layers or slices. As disclosed, a drill bit is designed as a three-dimensional "solid" model using a computer-aided design (CAD) program, which allows the designer to size, configure and place all internal and external features of the bit, such as (by way of example) internal fluid passages and bit blank voids, and the rakes and locations of external cutting element pockets, as well as the height, thickness, profile and orientation of lands and ridges on the bit face, and the orientation, depth and profile of waterways on the bit face and junk slots on the bit gage. The CAD program then provides a ".STL" file (i.e., a file which represents the surface of the bit body), which may later be transformed into a solid model and numerically "sliced" into a large number of thin, planar layers by known processes employing known computer programs.

After the mathematical slicing or layering is preformed, a horizontal platen is provided on which a granular or particulate material such as a tungsten carbide coated with a laser-reactive bonding agent, such as a polymer, a resin, and/or a low melting point metal such as Wood's metal or a lead alloy, or tungsten carbide intermixed with such a laser-reactive bonding agent is deposited in a thin, uniform layer. A finely focused laser, a focused light source such as from an incandescent or discharge type of lamp, or other energy beam, programmed to follow the configuration of the exposed section or layer of the bit body, is directed on the powder layer to melt the bonding agent and bond the metal particles together in the areas of the layer represented as solid portions of the bit in the model. Another layer of powder is then substantially uniformly deposited over the first, now-bonded layer, after which the metal particles of the second layer are bonded simultaneously to each other and to the first, or previously fabricated, layer by the laser. The process continues until all layers or slices of the bit, as represented by the solid model, have been deposited and bonded, resulting in a mass of bonded-particulate material comprising a bit body which substantially faithfully depicts the solid computer model in every dimensional respect. In areas of each layer that do not form a part of the completed article, the laser or other energy beam does not traverse and bond the particles. Thus, a drill bit, or at least a bit body comprised of bonded-particulate material, may be fabricated directly from the CAD-generated solid model without the necessity of designing and fabricating molds, and without the delicate, artistic hand labor required to define a cavity with the fine details of the topography of the face of a drill bit.

In a variation of the layered-manufacturing process, a tungsten carbide or other suitable powder or mix of powders (either metallic or nonmetallic) having the desired physical characteristics for a matrix may be uniformly premixed with a powdered binder, such as a metallic or nonmetallic (e.g., polymeric) binder powder, the premix deposited in layers, and the binder powder at least partially fused by a laser to bond the tungsten carbide particles into a matrix and define the bit body shape. After the layered-manufacturing process is completed, since the binder is already in place, the bit body may be heated to effect complete in situ infiltration of the matrix. Alternatively, layers of binder powder and matrix powder may be alternately deposited. In either case, additional binder may be placed on top of the bit body to infiltrate and fill any voids in the binder-consolidated metal powder matrix.

In another variation of the bit body layered-manufacturing process, a binder-coated matrix material (e.g., tungsten carbide) may be dispersed into a layer, and the binder coating melted with a laser sufficiently to cohere the particles of each layer and adjacent layers to one another. The bit body may then be heated to complete the in situ infiltration of the matrix. Additional binder may also be employed, as noted above.

In yet another variation of the bit body layered-manufacturing process, particulate material is dispersed into a layer, and the particles in selected areas of the layer affixed to one another by a polymeric adhesive or non-polymeric binder (e.g., water-glass). Due to the selective deposition of binder over the layer of particulate material in order to define a desired solid structure, this type of layered-manufacturing is typically referred to as "3D-Printing".

The bit body may then be placed in a furnace where it may be preheated to substantially remove the bonding agent. In such instances, certain metal powders may be at least preliminarily sintered or fused, such sintering to be enhanced or completed, if necessary, in a later furnacing operation.

If a powdered metal coated with bonding agent or metal intermixed with bonding agent is employed as the particulate material as mentioned above, the resulting bit body is a porous and permeable metal mass akin to a sponge or an open-celled foam, which can be imbibed with suitable hardenable infiltrants, either metallic, non-metallic, or a combination thereof, to complete the bit body. If an infiltrant in liquid form at room temperature (e.g., certain polymers) is employed, the bit may be mass infiltrated via capillary action, gravity, and/or pressurized flow at room temperature. If an infiltrant that is solid at room temperature is employed, the bit may be mass infiltrated by capillary action, gravity, and/or pressurized flow while the infiltrant is heated, such as by a furnace or an induction coil.

The infiltration process may include pouring a castable material able to withstand the high temperatures typically encountered during the infiltration process, such as ceramic, plaster, or a graphite slurry, around the particulate-based bit body or assembly to provide solid structure support upon solidification or hardening of the castable material. Similarly, the bit body or assembly may be dipped one or more times into a castable material, such as a ceramic, plaster, or graphite slurry, to form a relatively rigid material around the bit body. In either case, any orifices or openings leading to internal passageways in the bit body may be plugged prior to casting so that castable material that may otherwise be difficult to remove therefrom does not accumulate inside the bit body or assembly. Materials such as sand, graphite particles, and clay may be employed to plug these orifices or openings.

Alternatively, the particulate-based bit body or assembly may be placed in a refractory vessel with granular material packed around the particulate-based bit body up to its uppermost surface. This granular material substantially completely surrounds all surfaces of the bit body and may be vibrated to more densely pack the granular material. Because the granular material maintains its granular form during infiltration and is nonwettable by the infiltrant, the granular material effectively forms a "conforming" mold. That is, the granular material continues to provide structural support for the bit body during infiltration, even as dimensions of the bit body change, such as by expansion and shrinkage that may occur as bonding agent employed to preliminarily hold the metallic particles of the bit body together melts or vaporizes. The granular material may not substantially sinter, tack, or otherwise strengthen during the infiltration process so as to avoid complicating its removal from the bit body following infiltration, and thus continues to support the bit body substantially throughout infiltration without substantial change in its supporting physical characteristics.

A granular material that sinters, chemically reacts, or otherwise strengthens during the infiltration process may be used with bit bodies that undergo little or no shrinkage during infiltration in order to provide a more rigid mold to support the bit body. Substantially rigid molds may also be employed to provide support primarily during the first stages of infiltration, wherein the metallic particles of the layered bit body are imbibed with a sufficient amount of infiltrant and/or sufficiently sintered so that the bit body can structurally support itself.

Mold materials are typically selected to conform by shrinking and/or expanding along with any shrinkage and/or expansion of the bit body during the infiltration process and, thus, to maintain a substantially impermeable, conforming support structure during infiltration. These molds may also prevent infiltrant from flowing out of the bit body and pooling in gaps that may otherwise form between the bit body and the interior surface of a mold having dimensions that do not vary with the varying dimensions of the bit body during infiltration.

Typically, the materials used to form the support structure and/or fill any internal cavities in the bit body are non-wettable by the infiltrant. That is, these materials do not absorb or otherwise chemically or mechanically bond to or react with the infiltrant. Rather, because of their non-wettable quality, these materials form a barrier around the bit body so as to contain the infiltrant within the bit body and to prevent the support structure from binding to the bit body. In addition, such molds or support structures may be formed from materials that are substantially permeable to gases and vapors generated during the infiltration process, so as to preclude the formation or retention of gas- or vapor-created voids between the mold and the bit body during infiltration.

If a wettable material is used to form the support structure, the bit body may be coated with an infiltrant-resistive material, such as boron nitride, water-glass, or other suitable materials known in the art, prior to being placed within, or surrounded by, the support material. The boron nitride may be simply sprayed or painted onto various surfaces of the bit body, or the bit body may be dipped into a container of a boron nitride suspension to form a barrier through which the infiltrant cannot flow out of the bit body and imbibe the wettable support structure. Thus, the non-wettable and impermeable (by the infiltrant) resistive coating keeps the molten infiltrant contained within the layered bit body. In addition, such a coating may aid in forming a better surface finish for the bit body as it creates an intermediate shell to which the layered part and the infiltrant can conform during infiltration. Moreover, due to its liquid consistency, the coating fills small voids, vugs or intricately configured areas that may not be completely, intimately contacted by the surrounding support material. During the coating process, it is generally desirable to leave at least one surface uncoated so that the bit body has at least one non-resistive, or wettable, surface through which to imbibe additional infiltrant, even if infiltrant is already present in the preformed particulate-based bit body. Such a resistive coating may also be used in conjunction with variations of the infiltration process, whether the support material is wettable or non-wettable, to help form a better surface finish and help ensure that the infiltrant does not flow out of the particulate-based bit body and into the support structure, pool in any voids, gaps or vugs present between the bit body and the support structure, or form an unwanted skin of infiltrant on the outer surface of the bit body.

After the particulate-based bit body has been properly supported, the bit body and any supporting materials and/or structures are placed within a traditional furnace, an induction coil furnace, or other heating apparatus along with an infiltrant and heated until the infiltrant melts and substantially permeates the bit body through the free, or uncoated, surface exposed to the infiltrant. The materials that have been conventionally employed to infiltrate particulate-based bit bodies include copper-based alloys that include other elements, such as nickel.

The '280 Patent and the '550 Patent also disclose a tungsten carbide or other suitable powder or mix of powders (either metallic or non-metallic) having desired physical characteristics for a matrix substantially uniformly premixed with a powdered polymeric (or other nonmetallic) or metallic infiltrant powder, the premix deposited in layers and the infiltrant powder at least partially fused by a laser to bond the tungsten carbide particles into a matrix and define the bit body shape. After the layering and fusing process is completed, since the infiltrant is already in place, the bit body is heated in a furnace to effect complete in situ infiltration of the matrix. In another alternative to the foregoing procedure, layers of matrix powder alternating with layers of infiltrant powder are deposited. In either case, additional infiltrant may be added during infiltration to fill any infiltrant-deprived voids in the infiltrant-consolidated metal powder matrix. If an infiltrant-coated tungsten carbide or other suitable powder or mix of powders in a layered fashion is employed, a laser may be used to melt the infiltrant coating at least enough to cohere each layer, and the completed bit body placed in a furnace for an in situ infiltration of the bit body, with additional infiltrant being provided if necessary, as noted above.

A support structure may also be employed to infiltrate a bit body comprised of metallic particles intermixed with particles of an infiltrant material. With such a particulate-based bit body, it may not be necessary to leave at least one surface exposed for additional infiltrant to be imbibed into the bit body. Such a particulate-based bit body may, however, require structural support as described above.

While matrix-type bits may offer significant advantages over prior art steel body bits in terms of abrasion- and erosion-resistance, and while recent advances in matrix technology have markedly increased the toughness and ductility of matrix bodies, in many cases, the cost of a matrix-type bit and the time to fabricate same may result in the customer choosing a cheaper steel body bit with a faster delivery time. In either case, the customer must choose between a tough but less abrasion-resistant bit and a more expensive, highly abrasion- and erosion-resistant bit with reduced toughness.

Accordingly, it would be advantageous to provide a process of fabricating a drill bit, drill bit component, or other article of manufacture in less time, with less cost, and without sacrificing the orientation, alignment, and detail of the various features of the article of manufacture.

SUMMARY OF THE INVENTION

The method of the present invention includes employing known layered-manufacturing processes to fabricate a particulate-based, substantially hollow shell of a crown of a bit body, positioning a bit gage mold adjacent the substantially hollow shell, and disposing a core material, which may also be referred to herein as a bit material, within the substantially hollow shell and the bit gage mold to form a mold interior and a bit gage. The core material may be either a molten material or a particulate-based material.

The method of the present invention may also include infiltrating the substantially hollow shell and/or the core material (if the core material is particulate-based) with a binder, which is also referred to herein as an infiltrant. The method may further include disposing the substantially hollow shell within a soft, or conforming, mold material to support the substantially hollow shell during disposal of the core material within the substantially hollow shell and the bit gage mold. Preferably, the material of the soft, conforming section of the mold is a non-wettable material that substantially conforms to the exterior surface features of the bit crown and that prevents molten material from flowing substantially past the exterior surfaces of the bit crown.

Since, according to the method of the present invention, the bit crown is fabricated prior to fabrication of the interior and gage of the bit, the bit crown may be fabricated from different materials than the bit gage and the interior of the bit body. Thus, a bit body according to the present invention may include a hard, abrasion- and erosion-resistant material, such as tungsten carbide, on the crown thereof, and less expensive and tougher, more ductile materials, such as steel, within the interior of the bit body.

When a molten material is employed as the core material, the substantially hollow shell that comprises the crown of the drill bit is preferably infiltrated prior to forming the bit interior and the gage of the bit. As the molten core material is disposed within and adjacent to the substantially hollow shell, the binder with which the substantially hollow shell has been infiltrated, and which is exposed to the molten core material, preferably softens or melts and, thereby, mixes with or otherwise adheres to the core material to form a substantially integral structure. Alternatively, the molten core material may also be employed as a binder to infiltrate the particulate-based, substantially hollow shell substantially concurrently with disposal of the molten core material within and adjacent to the substantially hollow shell.

When the core material is particulate-based, the core material is preferably disposed within the substantially hollow shell and the bit gage mold prior to infiltration. The particulate core material and the particulate-based bit crown are then substantially integrally infiltrated with a binder. Thus, a substantially integral structure is formed.

Accordingly, the bit body of the present invention includes a particulate-based bit crown shell and an integral bit gage and bit interior secured to the bit crown shell.

A mold that may be employed to fabricate a bit body in accordance with the method of the present invention may include a soft, or conforming, section and an adjacent hard, rigid section. As discussed above, the soft, conforming section of the mold supports a preformed structure, such as a substantially hollow shell of a bit crown. The hard, rigid section of the mold is employed in combination with the preformed structure to define another structure, such as a bit gage, adjacent to the preformed structure. Upon definition of another structure by the hard, rigid section of the mold, the mold may be removed from the formed structure.

When such a mold is utilized to fabricate an earth-boring drill bit, the bit crown is disposed within the soft, conforming section of the mold so that the soft mold material substantially conforms to the shape of the exterior surface of the bit crown, including the various topographical features thereof. In assembling the soft, conforming section of the mold and the hard, rigid section of the mold, which comprises the bit gage mold, the hard, rigid section of the mold is disposed adjacent to the bit crown and the soft section of the mold. Thus, the hard, rigid section of the mold is preferably a substantially annular structure comprising a material, such as graphite or ceramic, that will withstand the temperatures and other conditions of disposing a molten material, such as a molten binder or molten core material, therein. Moreover, the interior of the hard, rigid section of the mold preferably includes relatively easily machinable features, such as forms for the gage pads and junk slots of the bit body.

Upon assembly of the soft, conforming section of the mold and the hard, rigid bit gage mold, the interior of the substantially hollow shell of the bit crown and the interior of the bit gage mold define a cavity. Mold inserts may be disposed within the cavity, as known in the art, to define various features of the bit body, including internal fluid courses, nozzle displacements, and topographical features of the bit body. Preferably, however, the nozzle displacements and topographical features of the bit body are defined during the layered-manufacture of the bit crown and by the bit gage mold.

Accordingly, the relatively complex topographical features of the bit crown may be substantially faithfully defined during the layered-manufacture of the bit crown, while the more easily defined and machined features, such as the gage pads, junk slots, and internal fluid courses of the drill bit, may be defined by the hard, rigid bit gage mold and by mold inserts.

Since layered-manufacturing processes are employed to fabricate only a shell of the bit crown and, thus, only a fraction of the entire bit body, the amount of time consumed by layered-manufacturing is reduced relative to that required when the entire bit body or an entire bit body shell is fabricated by layered-manufacturing processes.

Similarly, as the bit gage mold and mold inserts define larger, less complex features of the bit body, the bit gage mold and the mold inserts may be fabricated quickly relative to the amount of time that would otherwise be required to machine a mold that defines all of the features of the bit body. Moreover, the bit gage mold and mold inserts may be fabricated concurrently with the fabrication of the bit crown by layered manufacturing techniques.

Other features and advantages of the present invention will become apparent to those in of skill of the art through consideration of the ensuing description, the accompanying drawings, and the appended claims.

BRIEF DESCRIPTION OF THE DRAWINGS

FIGS. 7A–7D are schematic representations of a first bit body fabrication method of the present invention, in which a particulate material is employed to fabricate the interior of the bit body and the bit gage; and FIGS. 8A–8C are schematic representations of a second bit body fabrication method of the present invention, in which a molten material is employed to fabricate the interior of the bit body and the bit gage.

DETAILED DESCRIPTION OF THE INVENTION

Figure 1:
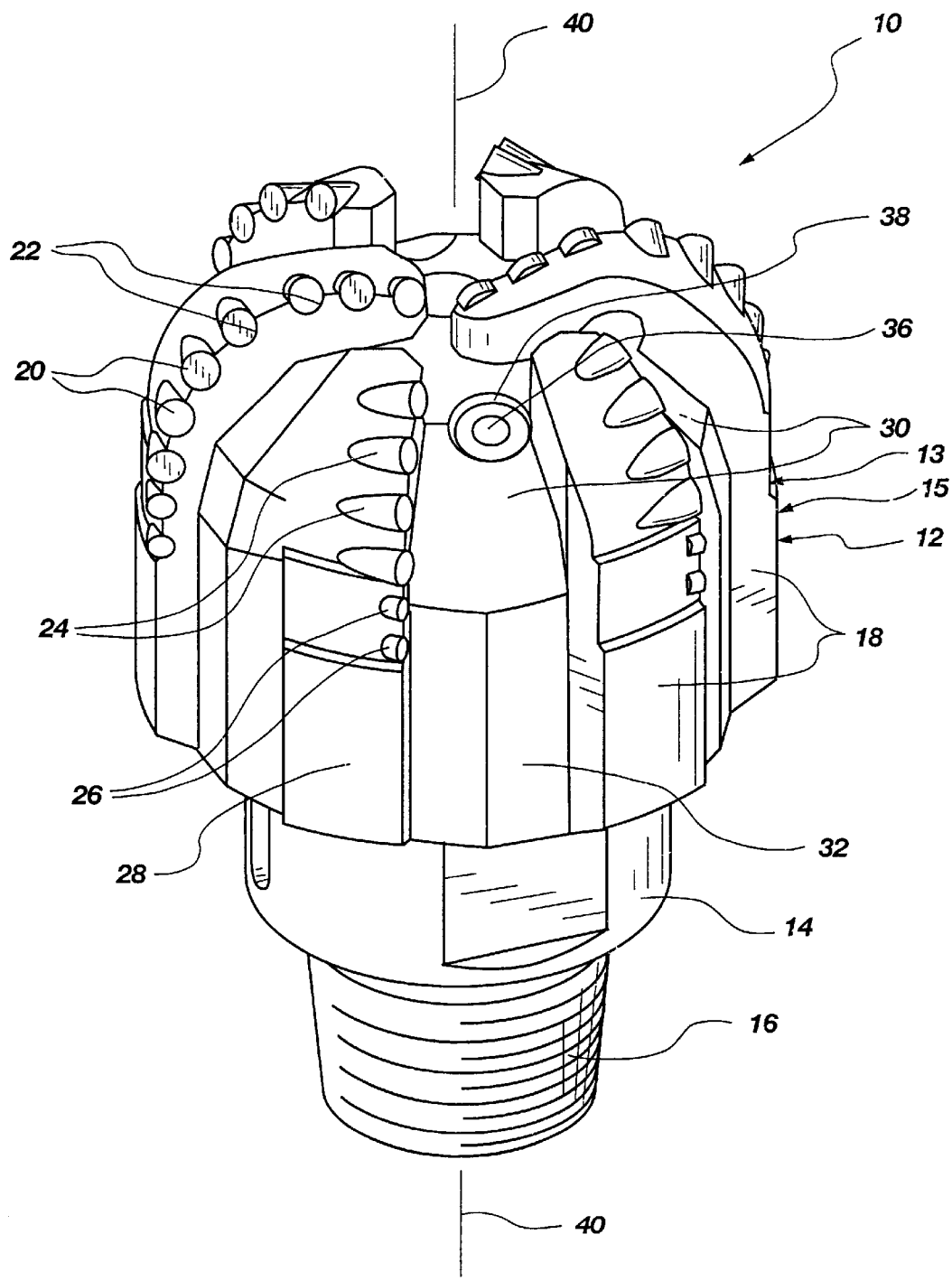
FIG. 1 is an inverted perspective view of an assembled drill bit according to the present invention.
Figure 3:
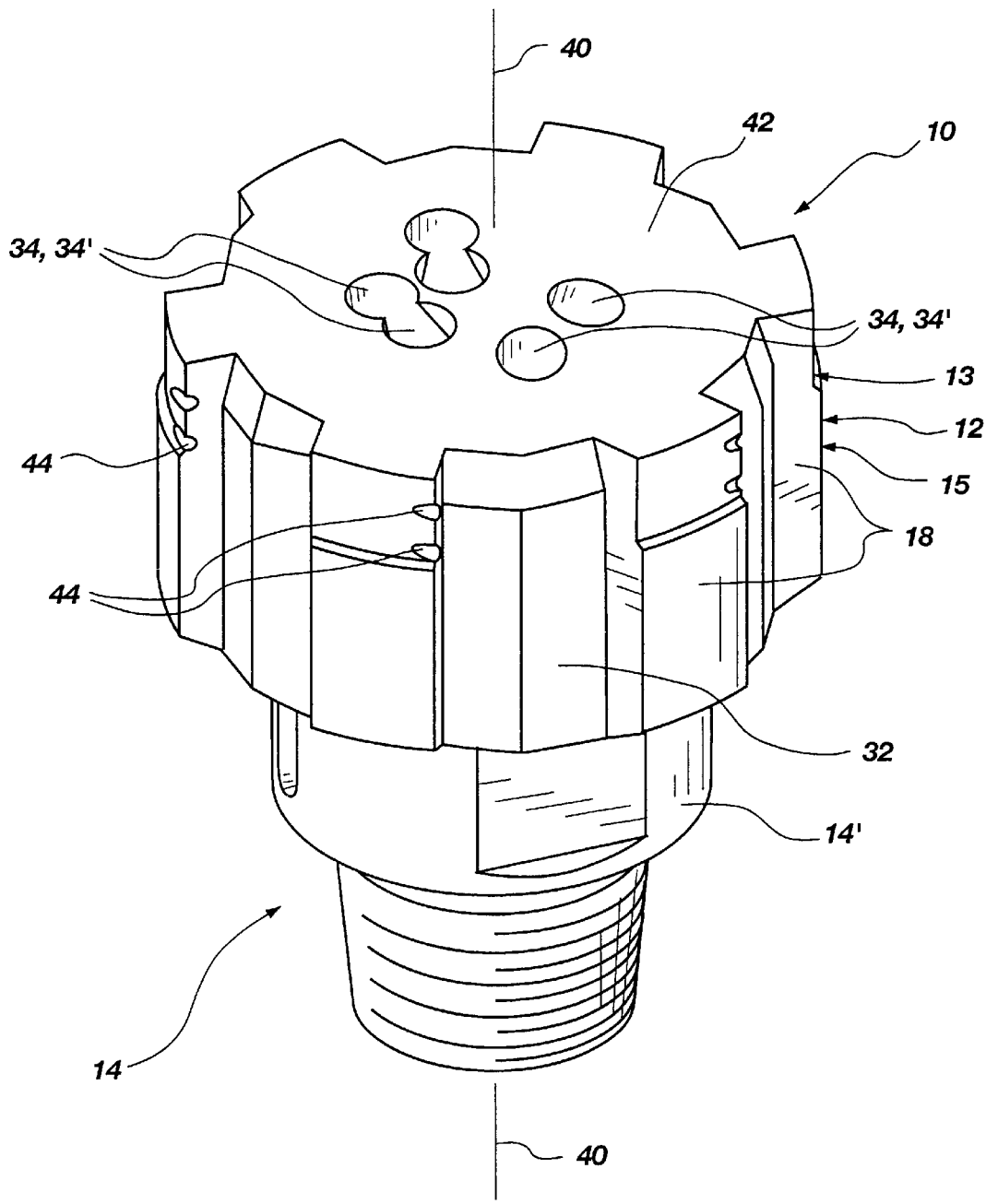
FIG. 3 is a partial perspective view of the drill bit of FIG. 1, sliced transversely to the longitudinal bit axis to expose a section thereof and to illustrate the crown of the bit body and the bit interior.

With reference to FIGS. 1 and 3 of the drawings, an exemplary drill bit 10 according to the present invention is illustrated. Drill bit 10 includes a bit body 12 with a substantially hollow shell of a bit crown 13, a bit interior/bit blank 14 configured complementarily to and disposable within bit crown 13, and a bit gage 15 continuous with bit interior bit blank 14 and disposed about the periphery thereof.

Figure 2:
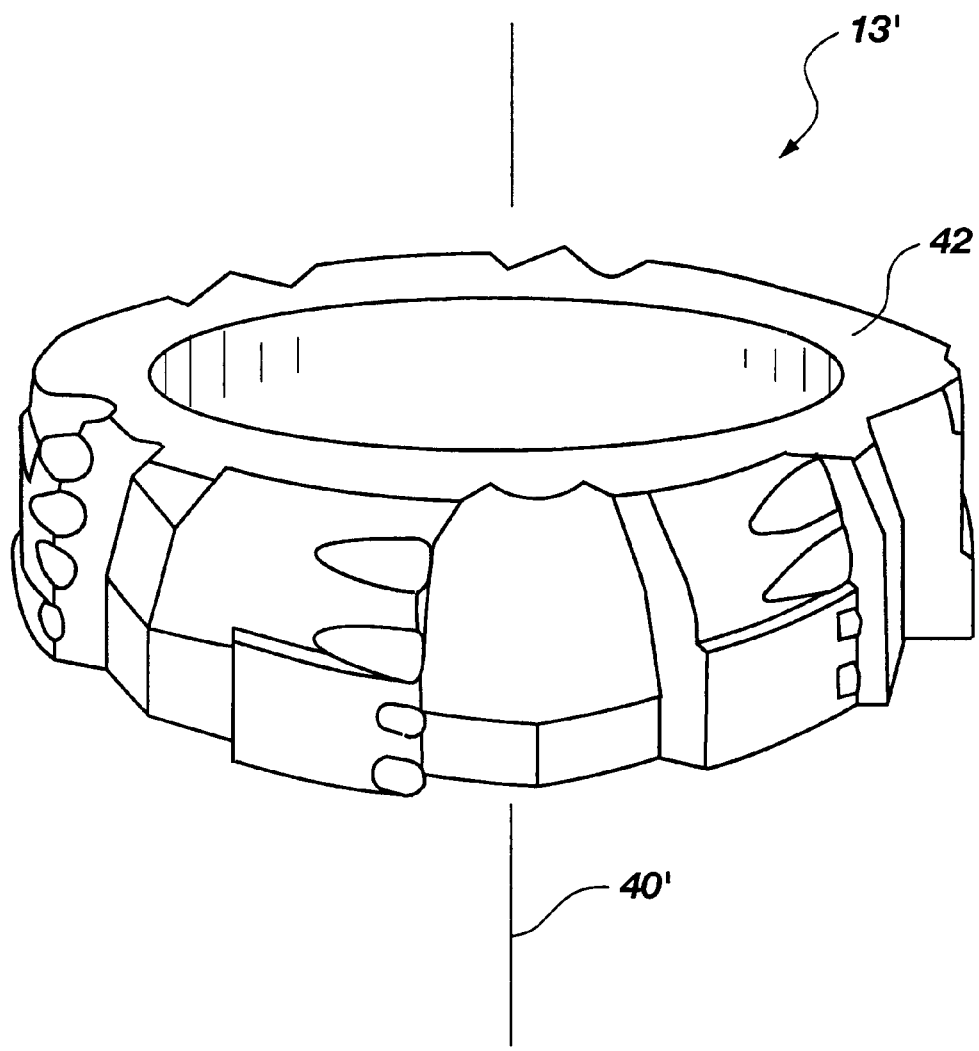
FIG. 2 is a perspective view of a solid or three-dimensional model of a substantially hollow shell of the crown of the bit body of the drill bit of FIG. 1 as might be modeled by a CAD system, sliced transversely to the longitudinal bit axis to expose a section thereof.

Referring now to FIG. 2 of the drawings, an exemplary bit crown model 13' is depicted as three-dimensionally modeled by a state-of-the-art CAD system. Such systems are well-known and widely used, and a particularly suitable, commercially available CAD system for implementation of the present invention is the Pro/ENGINEER, offered by Parametric Technology Corporation.

Referring again to FIGS. 1 and 3, bit crown 13 may be fabricated by known layered-manufacturing processes, including, without limitation, selective laser sintering ("SLS"), stereolithography ("STL"), three-dimensional printing, laminated object manufacturing ("LOM"), and other so-called rapid prototyping techniques. The bit crown 13 fabricated by these manufacturing techniques may include a variety of external and internal features or components.

As illustrated, bit crown 13 includes six blades or wings 18 including cutter pockets 22 configured to carry cutting elements 20. Cutter pockets 22 may include inclined buttresses 24 to support a cutting element 20 from the rear.

Blades 18 are separated by generally radially extending fluid courses 30 that, when bit crown 13 and bit gage 15 are disposed adjacent one another and properly oriented relative to one another, lead to junk slots 32 disposed between gage pads 28 of bit gage 15. The fluid courses 30 and junk slots 32 of an operable drill bit may be provided with drilling fluid, or "mud", from the drill string through bit interior/bit blank 14. In the operation of drill bit 10, drilling fluid enters drill bit 10 through bit interior/bit blank 14, and flows through internal fluid passages 34 (FIG. 3), which lead to nozzles 36 that are disposed in cavities 38. Cavities 38 open into fluid courses 30.

As illustrated, bit gage 15 includes a gage pad 28 longitudinally adjacent each blade 18 of bit crown 13. Gage trimmers (not shown) in FIG. 3 may be positioned within pockets 26 located immediately adjacent and above (as depicted in FIG. 1) gage pads 28.

Blades 18, fluid courses 30, and the topographical features of bit body 12 collectively define what may be termed a "bit face", being the surface of the bit that contacts the undrilled formation at the bottom of a borehole. The exterior shape of a diametrical cross-section of bit crown 13 taken along the longitudinal bit axis 40 defines what may be termed the "bit profile" or "crown profile".

The end of bit interior/bit blank 14, or a shank 14' secured thereto, may be threaded with an API pin connection 16, as known in the art, to facilitate the attachment of drill bit 10 to a drill string.

Figure 1A:
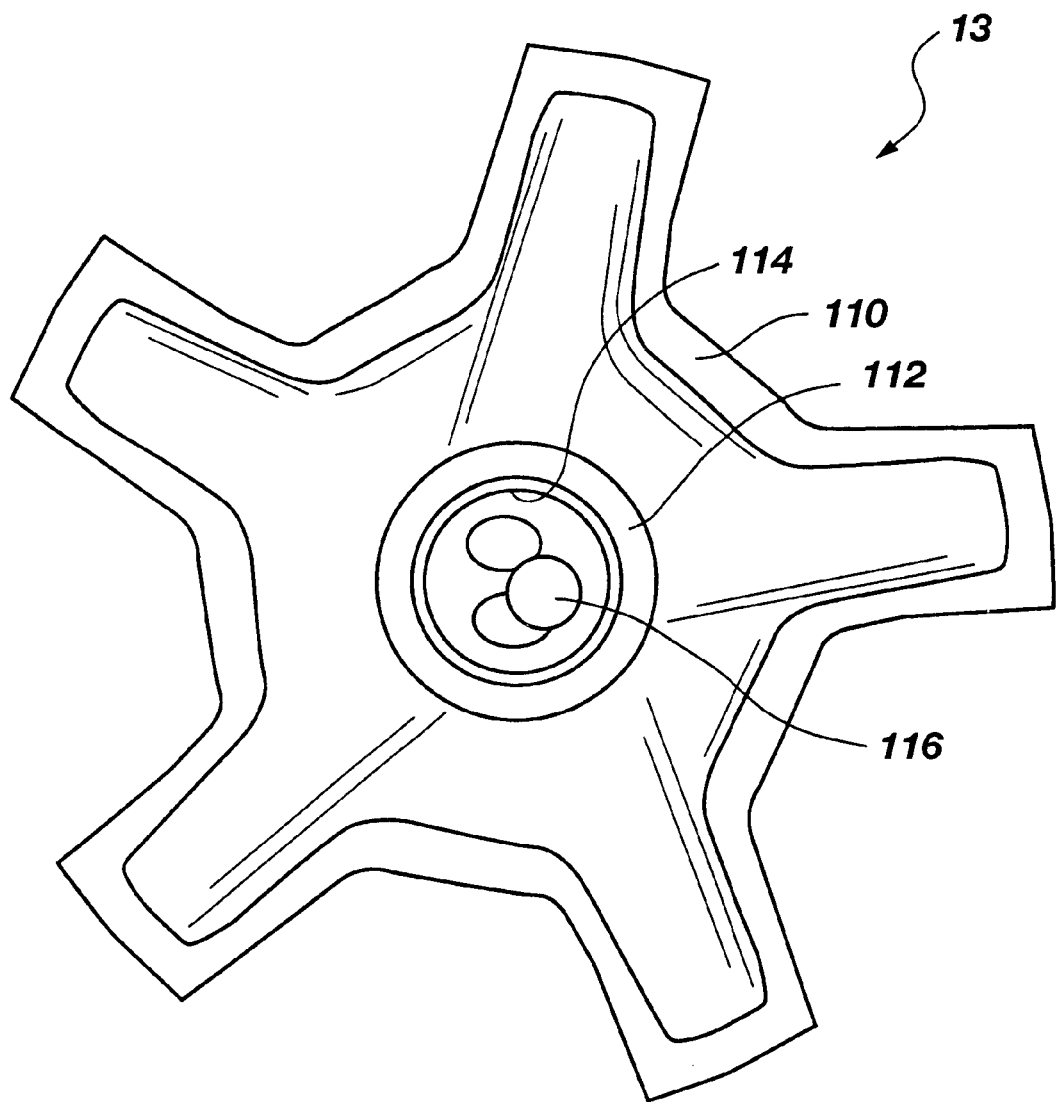
FIG. 1A is top view of a substantially hollow bit crown according to the present invention.

Referring to FIG. 1A, an embodiment of bit crown 13 is illustrated, which includes an outer shell 110 and an inner shell 112. Inner shell 112 is preferably substantially centrally located within bit crown 13, and includes a central plenum 114 with fluid courses 116 extending therefrom substantially to the periphery or face of bit crown 13 and in communication with the central plenum 114. Accordingly, upon assembly of bit crown 13 with other components of drill bit 10 (see FIG. 1), inner shell 112 may be disposed adjacent bit shank 14' (see FIG. 1) and central plenum 114 aligned and disposed in communication with the passageway of bit shank 14.

As central plenum 114 is located within bit crown 13, the fluid courses 116 extending therefrom are short and straight relative to the internal fluid courses of conventional earth boring drill bits. Accordingly, fluid courses 116 will not erode as quickly as the long, curved internal fluid courses of conventional earth-boring drill bits as drilling fluid or other liquids flow therethrough.

As illustrated by FIG. 2, a three-dimensional model 13' of bit crown 13 (see FIG. 1) may be numerically "sliced" along any desired plane and, in this instance, along a plane perpendicular to the longitudinal bit axis 40' of bit crown model 13'. Looking at surface 42, it is readily apparent that the bit body model may be readily numerically characterized as a series of superimposed, substantially two-dimensional thin layers of gradually varying cross section, which substantially two-dimensional layers, when completely stacked, define a three-dimensional model 13' of bit crown 13, as depicted in FIG. 2.

Figure 2A:
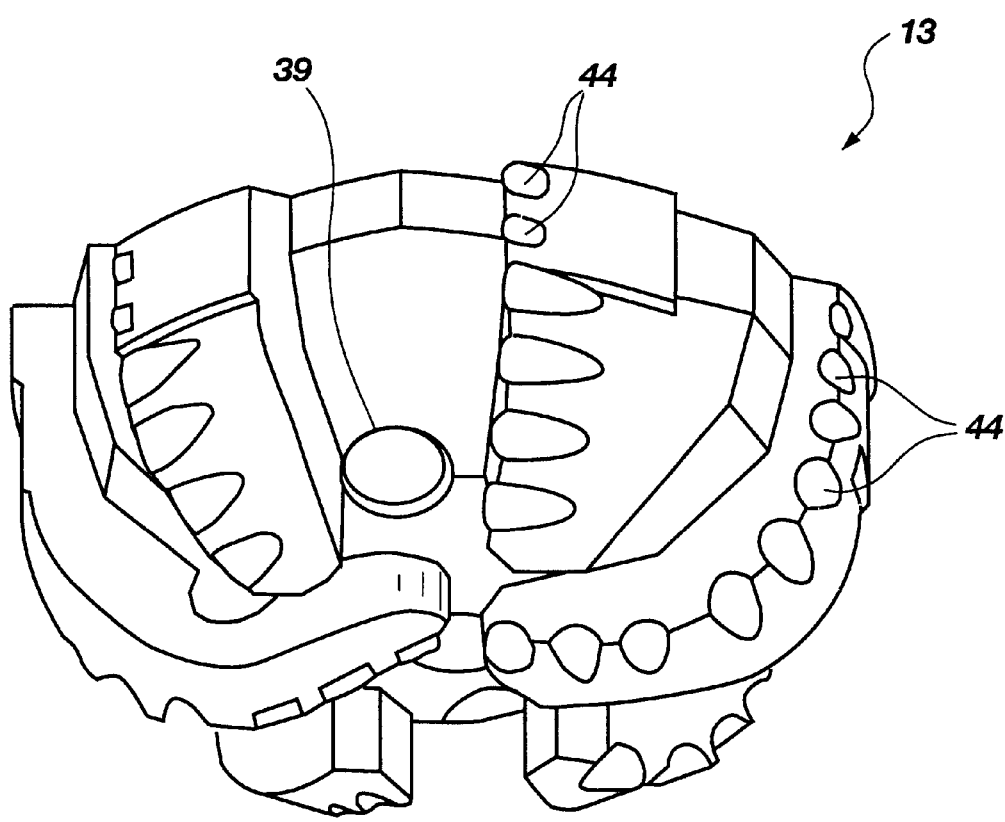
FIG. 2A is a perspective view of a bit crown patterned after the model of FIG. 2.

FIG. 2A also illustrates that a bit crown 13 patterned after model 13' may include interior apertures or voids to define nozzle displacements 39, portions of internal fluid passages 34 (see FIG. 3), or other features of bit crown 13. During the layered-manufacture of bit crown 13, substantially longitudinally adjacent apertures or voids in contiguous, superimposed layers or slices comprise three-dimensional passages or openings through the shell of bit crown 13. As bit crown model 13' does not model cutting elements, gage trimmers, nozzles, or other components that may be subsequently assembled to a bit body to complete a drill bit, voids 44 may be formed in the surfaces of bit crown 13 to receive these subsequently added components.

Figure 4:
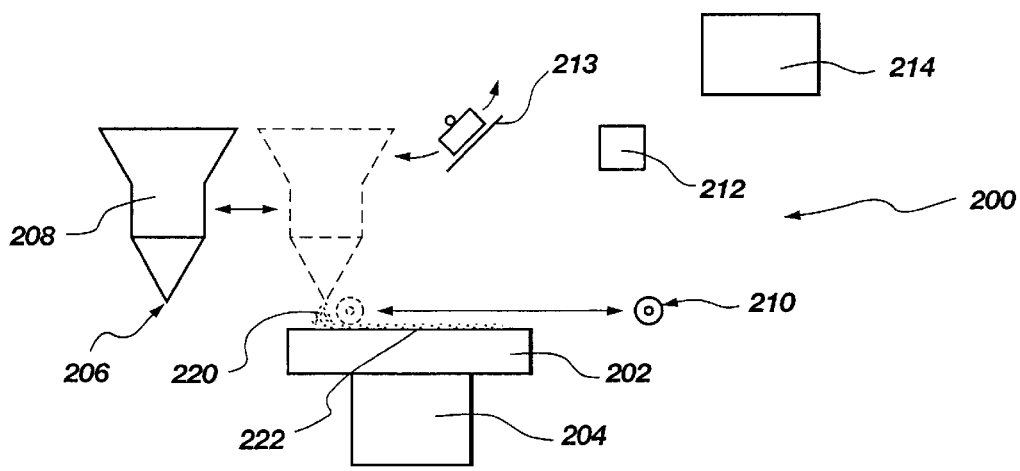
FIG. 4 is a schematic representation of a first computer-controlled layering apparatus suitable for use in the fabrication of a substantially hollow shell of a bit crown according to a preferred layered-manufacturing process of the method of the present invention.
Figure 4A:
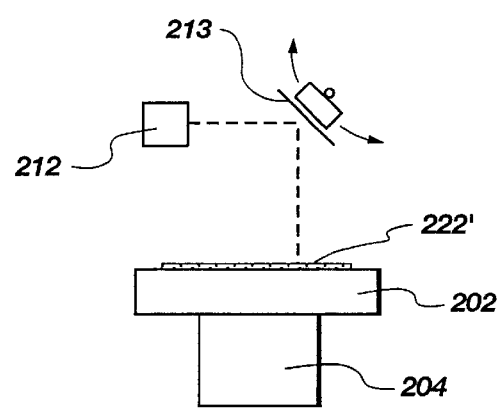
FIGS. 4A–4D are schematic representations that depict the use of the apparatus of FIG. 4 in the manufacture of a substantially hollow, particulate-based shell of a bit crown.
Figure 4B:
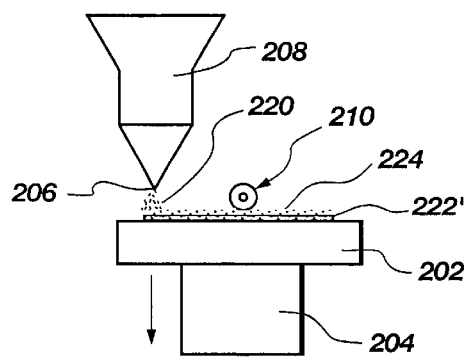
Figure 4C:
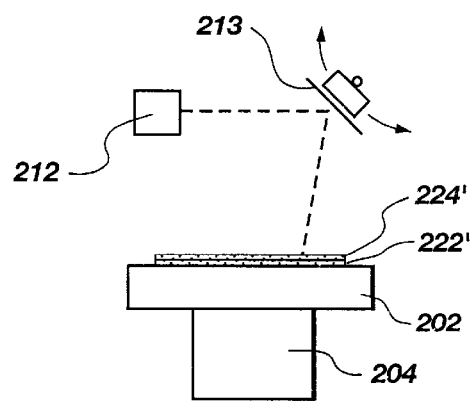
Figure 4E:
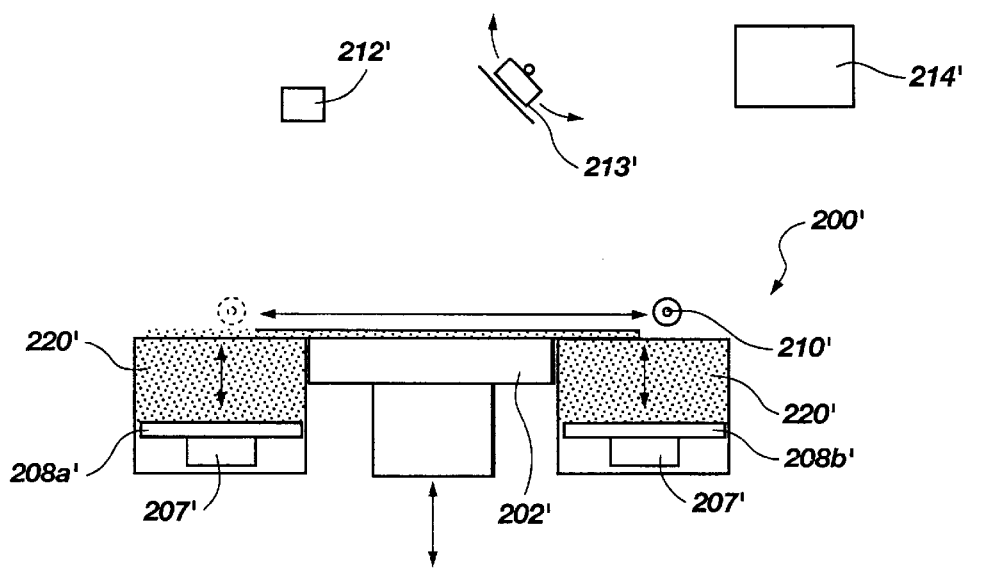
FIG. 4E is a schematic representation of another apparatus that may be employed in the layered-manufacture of a substantially hollow, particulate-based shell of a bit crown.
Figure 4D:
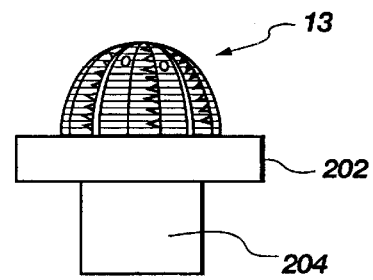

Referring now to FIGS. 4–4D, an exemplary apparatus 200 that may be employed to fabricate a substantially hollow shell of a bit crown in accordance with the present invention is schematically illustrated. Apparatus 200 includes a horizontal platen 202 on which a bit crown 13 (see FIGS. 1 and 3), patterned after bit crown model 13' (see FIG. 2), is to be formed. Platen 202 is preferably vertically movable in precise increments, as by a stepper motor assembly or other means 204. A particulate spreader, comprising a linearly-extending feed head 206 at the bottom of hopper 208, is horizontally movable across and above platen 202 to deposit a layer of particulate material 220, or particles, on platen 202. Hopper 208 may be vibrated to facilitate the flow of particulate material 220 and to render the flow more uniform, if desired. A vertically-fixed, horizontally-extending roller or scraper bar or blade 210 is also horizontally movable across platen 202 and may, if desired, be suspended from hopper 208. Fixative head 212 is suspended above platen 202. Fixative head 212 may comprise one of a variety of assemblies, depending upon the nature of the particulate material 220 employed to fabricate the bit body and the desired binder alternative employed to perform the method of the invention. Fixative head 212 may comprise, for example and not by way of limitation, a laser, an ink-jet nozzle, or a metal spray gun. When fixative head 212 includes a laser, apparatus 200 may also include a galvanometer 213 with one or more pivotal mirrors. The sequence of operation and movements of platen 202, hopper 208, roller 210 and fixative head 212 are controlled by a computer 214 employing a suitable machine control program as is currently known in the art. Computer 214 may comprise a commercially available personal computer employing an Intel Pentium®-series or Pentium®II-series microprocessor. Vendors offering suitably-programmed computers employing systems responsive to CAD .STL file formats and associated hardware adaptable to the method of the present invention include DTM Corporation, Austin, Tex.; Soligen, Inc., Northridge, Calif.; Stratasys, Inc., Eden Prairie, Minn.; Helisys, Inc. of Torrance, Calif.; and 3D-Systems, Inc., Valencia, Calif.

With reference to FIG. 4E, an alternative apparatus 200' for fabricating a rotary drag bit in accordance with the present invention is illustrated. Apparatus 200' includes a horizontal platen 202', similar to platen 202 of apparatus 200 illustrated in FIGS. 4 through 4D, on which a bit crown 13 (see FIGS. 1 and 3), patterned after bit crown model 13' (see FIG. 2), is to be formed. A particulate spreader, comprising cartridges 208a' and 208b' disposed beneath platen 202' and a roller or scraper bar or blade 210' horizontally movable across platen 202', deposits a layer of particulate material 220', or particles, over platen 202' in substantially uniform thickness. Cartridges 208a' and 208b' are preferably vertically movable in precise increments, as by a stepper motor assembly or other means 207' in order to move particulate material 220' upward for disposal on platen 202'. Apparatus 200' also includes a fixative head 212', a galvanometer 213' including at least one mirror, and a computer 214', similar to those of apparatus 200, described above in reference to FIGS. 4–4D.

Referring again to FIGS. 4–4D, in a selective laser sintering embodiment of the layered manufacturing process, the particulate material 220 preferably comprises particles of a hard, abrasion- and erosion-resistant matrix material, such as tungsten carbide, mixed with a powdered binder material, such as a polymeric resin or a low melting point metal. Thus, as a fixative head 212 comprising a laser directs laser energy toward galvanometer-mounted mirrors 213, which reflect the laser energy toward selected areas of a layer 222 of particulate material 220, the binder material secures, or affixes, adjacent particles of the matrix material within these selected areas to one another.

Alternatively, particulate material 220 may comprise particles of a hard, abrasion- and erosion-resistant matrix material, such as tungsten carbide, coated with a binder material, such as a polymeric resin or a low melting point metal.

As another alternative, in a three-dimensional printing embodiment of the layered-manufacturing method of the present invention, fixative head 212 may deposit a binder material, such as a polymeric resin or a low melting point metal, onto selected areas of a layer 222 of particulate material 220. As the binder material cures or hardens, the particles of matrix material within these selected areas are secured, or affixed, to one another.

Particles 220 of the selected areas are preferably affixed in a regular horizontal pattern representative of a first or lowermost transverse layer or slice of bit crown model 13' (see FIG. 2), as numerically defined and stored in computer 214. The fixative head 212 is directed to affix particles of layer 222 in those areas where bit crown 13 is comprised of solid material and avoids those areas in the hollow region of bit crown model 13' or wherein a void or aperture exists in a layer of bit crown model 13'.

As shown in FIG. 4A, the laser melts or sinters and fuses particles 220 together, resulting in what may be termed a first particle layer 222', or first preform layer, having the peripheral outline of bit crown model 13' (see FIG. 2) at that vertical or longitudinal level, apertures or voids in that layer remaining as loose, unfused particles (see FIG. 2A). Fixative head 212 is then withdrawn and, as shown in FIG. 4B, platen 202 indexed downwardly a vertical distance which may or may not be equal to the thickness of first particle layer 222' (i.e., a layer-manufactured structure may have layers of different thicknesses); a second layer 224 of particles 220 is deposited by feed head 206 of hopper 208, then spread and smoothed by roller or scraper 210 as previously described. As shown in FIG. 4C, the laser is again directed, this time at second particle layer 224', to follow a horizontal pattern representative of a second, higher layer or slice of bit model 13' (see FIG. 2), as numerically defined and stored in computer 214, fusing second layer 224 into second particle layer 224', or second preform layer. Preferably, second particle layer 224' is also simultaneously fused to first particle layer 222'. It will be appreciated that, in the drawing figures, the thicknesses of first and second particle layers 222' and 224', respectively, have been exaggerated to clearly illustrate the layered manufacturing process. Since the crown profile of bit crown 13 is not cylindrical, but somewhat tapered, and the apertures or voids therein extend laterally as well as longitudinally, the net result is that second particle layer 224', while contiguous with first particle layer 222', may not be identical thereto.

The particle deposition, smoothing and selective fusing of each successive preform layer is continued under computer control for hundreds or even thousands of layers until a recognizable three-dimensional structure, as depicted in FIG. 2, gradually emerges, and the layering process is further continued until a completed bit crown 13 (see FIGS. 1 and 3) is achieved, as shown in FIG. 4D.

Particulate material in the unbonded areas of the layer is then removed and may be recovered, thus providing a substantially hollow bit crown 13 structure. The recovered material may be subsequently used to form another bit crown 13.

Alternatively, with continued reference to FIGS. 4–4D, particulate material 220 may be deposited on the platen 202 in one or more rings or shells approximating a layer of bit crown model 13' (see FIG. 2) and any internal features (e.g., internal fluid passages) thereof, if desired. Particulate material 220 may then be bonded together by a laser, and a subsequent, controlled deposition of particles then effected to define the second layer 224, which is then formed and substantially simultaneously fused to the first layer 222.

Figure 5:
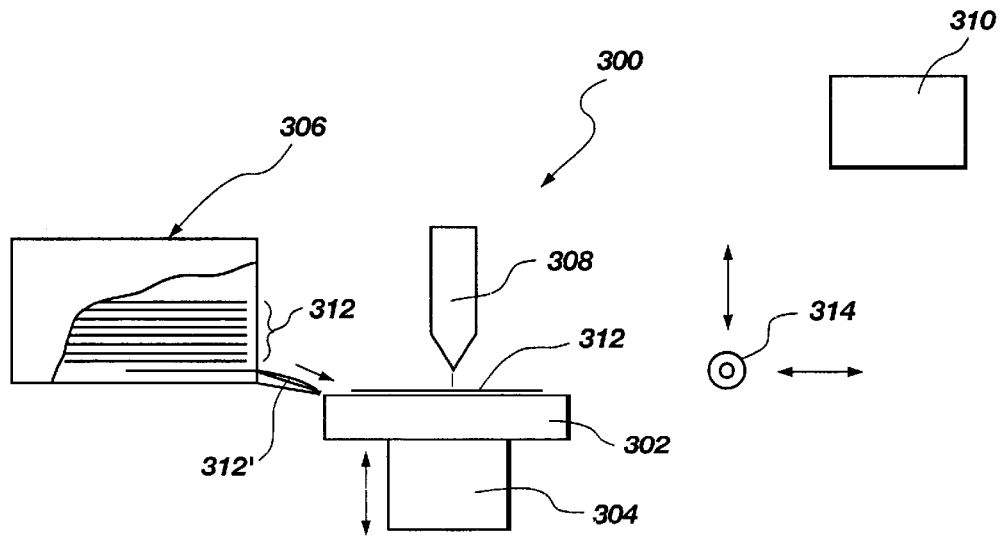
FIG. 5 is a schematic representation depicting yet another apparatus that may be employed to fabricate the substantially hollow bit crown shell by laminated object manufacturing techniques.

Yet another variation of the layered manufacturing process that is useful in fabricating the substantially hollow shell of the bit crown 13 of the present invention (see FIGS. 1–3), which process is typically referred to as laminated object manufacturing, employs sheets of material to form bit crown 13. As depicted in FIG. 5 of the drawings, an apparatus 300 for effecting the method includes a platen 302, actuating means 304 for moving platen 302 in vertical increments, a sheet feeder 306, a laser head 308, and a control computer 310. Sheet feeder 306 may comprise a photocopier-type feeder and provide individual sheets, or may comprise a roll-type feeder with a feed roller and a take-up roller, as desired. In either case, a sheet 312 of suitable material is placed on platen 302. Laser head 308, under control computer 310, cuts an outline of the periphery of that layer of the bit crown 13 being formed. The surrounding sheet material may then be removed, if desired, and a second, uncut sheet 312' placed over sheet 312 is bonded to sheet 312 by suitable means, after which laser head 308 cuts the perimeter outline of the second layer of bit crown 13. If desired, the laser may be used to rapidly heat the second sheet 312' and bond it to the first sheet 312 before sheet 312' is cut at its periphery. Alternatively, a heated roller 314 may be biased against and rolled over the uppermost sheet 312' to secure the uppermost sheet 312' and the immediately adjacent, underlying sheet 312 to each other before sheet 312' is cut to define the periphery of the next, corresponding layer of bit crown 13.

Such bonding can be effected by melting or sintering, or by an adhesive material disposed on the top, bottom, or both surfaces of each sheet. One or both surfaces of the sheets may be precoated with adhesive, or adhesive may be applied thereto, such as by rolling or spraying, during the layered manufacturing process.

Mold Assembly

Soft Mold

Figure 6:
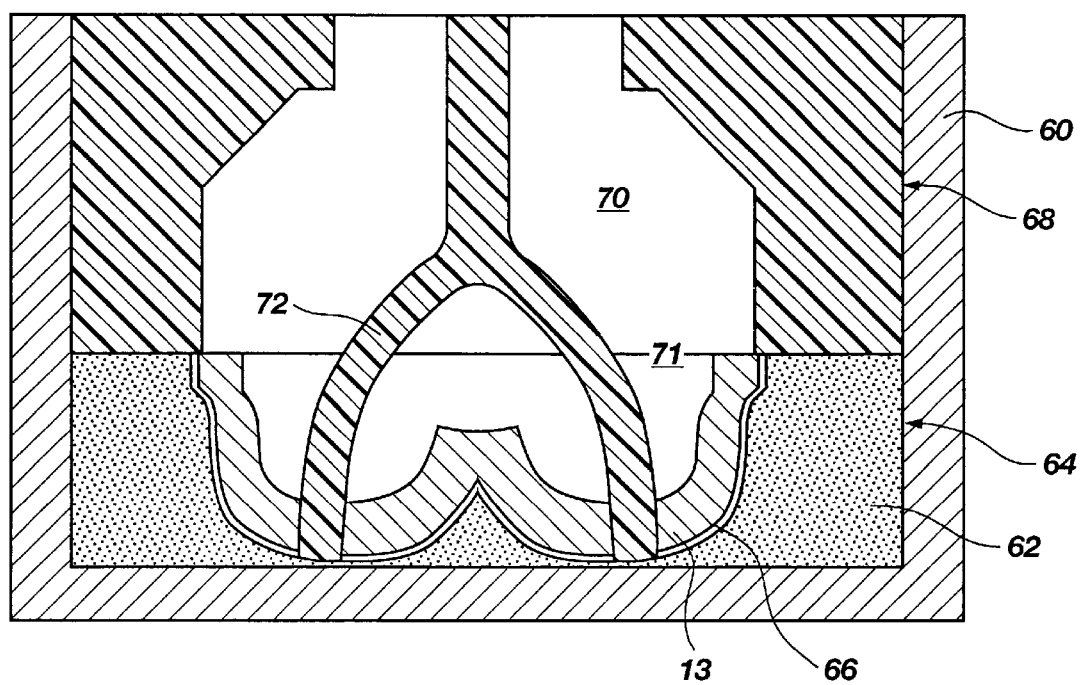
FIG. 6 is a schematic representation of a mold that may be employed in combination with a substantially hollow shell of a bit crown to fabricate a bit body in accordance with the method of the present invention.

With reference to FIG. 6, the exterior surface of bit crown 13 may be coated with a sealer or other nonwettable substance, such as boron nitride, aluminum nitride, NICO-BRAZE GREEN STOP-OFF manufactured by Wall Colmonoy, Inc. of Madison Heights, Mich., or ZIRCWASH manufactured by Zyp Coatings, Inc. of Oak Ridge Tenn., to close the exterior pores of the matrix of bit crown 13 and any pores opening into any apertures or voids through bit crown 13.

Bit crown 13 is then inverted, exterior surface facing downward, and positioned in a mold casing 60 that includes a soft bit crown mold 64, which is also referred to herein as a soft mold, therein. Bit crown mold 64 comprises a mold material 62. Preferably, mold material 62 is a granular material non-wettable by a molten material used to infiltrate bit crown 13 or to both fill and infiltrate bit crown 13, such as casting sand, graphite, ceramic powder, silica, alumina, silicon carbide, combinations thereof, or other suitable materials known in the art that will, preferably, not harden or otherwise become rigid during the infiltration process. Preferably, mold material 62 is vibrated or otherwise settled so as to substantially pack mold material 62 around bit crown 13 and in substantial abutment with the exterior surfaces thereof. Mold material 62 or another non-wettable, granular or particulate material may also be provided in any apertures through or voids within bit crown 13.

When mold material 62 comprises a granular, non-wettable material, bit crown mold 64 is preferably a "soft" or unconsolidated mold, which may continue to substantially conform to and support bit crown 13 during changes in the size or conformation of bit crown 13. For example, as bit crown 13 is heated, such as during furnacing and infiltration processes, bit crown 13 may shrink in size due to the dissipation or vaporization of the resin or other binder material that holds the particles of bit crown 13 together. The ability of a granular, non-wettable mold material 62 to be relatively compliant relative to bit crown 13 may, during infiltration of bit crown 13 or a bit body 12 including the bit crown, also prevent an infiltrant material from pooling or accumulating in gaps that may otherwise form between a substantially rigid, dimensionally stable mold and a shrinking bit body.

It may also be desirable to flow a scavenging, reducing, or oxidizing gas, such as oxygen, hydrogen, or mixtures of oxygen and hydrogen with other gases, or a solvent, such as an alcohol, ester, hydrocarbon, petroleum, chlorinated solvent, ketone, or another organic or inorganic material through bit crown 13 to dissolve and substantially remove the resin or other binder material from bit crown 13. A bit crown mold 64 formed of a granular, non-wettable material would facilitate the flow of such gases or solvents away from bit crown 13 and through mold 64.

Alternatively, bit crown mold 64 may be formed of a material that is, initially, substantially rigid and weakens as bit crown mold 64 is exposed to an elevated temperature, such as the infiltration temperature. Thus, a bit crown mold 64 fabricated from such a material may be easily removed from an infiltrated bit crown 13 or other article of manufacture. For example, sand bonded together with a polymer may provide rigid support until the polymer is heated to the temperature at which the polymer melts, vaporizes, decomposes, or otherwise dissipates, leaving the sand in a relatively loose form.

It is also contemplated that a relatively loose material that solidifies or otherwise strengthens during the infiltration process, such as by sintering, tacking, and/or chemically bonding, may provide sufficient support for bit crown 13. That is, a mold material 62 could be selected that would retain its unconsolidated nature during removal of the resin or other binder material initially securing the particles of bit crown 13 together and during changes in the conformation or size of bit crown 13. At higher temperatures, however, after the resin or other binder material has been removed from bit crown 13 and bit crown 13 is relatively dimensionally stable, such a mold material 62 could solidify or otherwise strengthen to provide a more rigid support. Thus, in effect, bit crown mold 64 conforms to bit crown 13 during the beginning stages of furnacing and then becomes more firm during furnacing or infiltration.

Accordingly, mold material 62, while preferably non-wettable, may alternatively comprise a wettable substance, such as steel and/or stainless steel, to improve the thermo-conductivity of bit crown mold 64. Such materials may, however, adhere or bond to bit crown 13 during infiltration or become integrally infiltrated with bit crown 13. Accordingly, it may be desirable to coat the exterior surfaces of bit crown 13 and any other surfaces of bit crown 13 that contact such a mold material 62 to prevent the adherence or bonding of mold material 62 to bit crown 13 or the integral infiltration of bit crown mold 64 and bit crown 13. Exemplary means for preventing adherence or bonding of mold material 62 to bit crown 13 include spraying, painting, dipping, or otherwise coating bit crown 13 with a sealer or other non-wettable substance, such as the aforementioned boron nitride, water-glass, aluminum nitride, NICOBRAZE GREEN STOP-OFF, and other materials, such as ZIRCWASH. These or other coating materials may also serve to keep an infiltrant material within the confines of the surfaces of bit crown 13 or a bit body 12 including the bit crown to prevent integral infiltration of bit crown mold 64 and bit crown 13.

Moreover, it is contemplated that such a coating 66 may improve the surface finish of the finished bit crown 13 by filling exterior and/or interior pores of the layer-manufactured bit crown 13 and by providing a more consistent surface against which the infiltrant material may solidify. Thus, a coating 66 may be useful in other embodiments of the inventive method regardless of the type of material from which the mold or support structure is made.

As another alternative, mold material 62 may comprise a hardenable liquid material, such as Cotronics 770 (a hardenable liquid ceramic), a plaster, a graphite slurry or other materials known in the art that can provide solid structural support upon solidification and withstand the high temperatures encountered during the infiltration process. Such a mold material 62 may be poured into mold casing 60 and the exterior surface of bit crown 13 positioned within mold casing 60 so as to contact mold material 62 and, preferably, such that mold material 62 substantially conforms to the exterior surface of bit crown 13. Mold material 62 is then permitted to harden to form bit crown mold 64. Similarly, the exterior surfaces of bit crown 13 may be dipped one or more times into a castable mold material, such as a ceramic, plaster, or graphite slurry to form a relatively rigid bit crown mold 64 about the exterior periphery of bit crown 13.

Rigid Mold and Mold Inserts

With continued reference to FIG. 6, a substantially rigid bit gage mold 68 is positioned within mold casing 60 above bit crown 13 and in contact with bit crown mold 64. Bit gage mold 68 may be fabricated from graphite, ceramic, plaster, other conventionally employed refractory mold materials, or other substantially rigid materials that withstand high temperatures, such as the melting temperatures of the infiltrant materials to be disposed therein. Bit gage mold 68 is preferably an annular, or ringshaped, member defining a gage cavity 70 therethrough. Preferably, cavity 70 of bit gage mold 68 and the hollow interior of bit crown 13 are continuous with each other, and define a bit interior cavity 71. Cavity 70 preferably has a configuration corresponding to the upper, exterior surfaces of bit body 12 to be formed, including gage pads 28 and the junk slots 32 therebetween (see FIGS. 1 and 3).

Mold inserts 72 of a type known in the art may be positioned within bit interior cavity 71 in locations where internal fluid courses 34 (see FIG. 3) or other internal passages or voids through bit body 12 (see FIGS. 1 and 3) are to be formed. Mold inserts 72 that are particularly suitable for use in the method of the present invention are easily removable from a formed bit body 12 (see FIG. 1) by destruction or as otherwise known. Exemplary mold insert 72 materials include resin-bonded sand, graphite, ceramics, and plasters. Preferably, a bottom end of one or more of the mold inserts 72 is disposed within a void that defines a nozzle aperture in a bit crown 13 so that the nozzle aperture and its corresponding internal fluid course 34 (see FIG. 3) of the subsequently fabricated bit body 12 will be contiguous.

Integrating the Bit Crown, the Bit Gage, and the Bit Interior

Turning now to FIGS. 7A–7D, a preferred embodiment of a method of fabricating a drill bit 10 (see FIG. 1) that includes the layer-manufactured bit crown 13 comprises disposing one or more particulate core materials 74 within bit interior cavity 71 and integrally infiltrating bit crown 13 and particulate core material 74.

Exemplary particulate core materials 74 that may be employed to form the interior of bit body 12 include, without limitation, tungsten carbide, iron, steel, stainless steel, titanium, a titanium alloy, nickel, a nickel alloy, Invar® alloy, other tough and ductile materials, other materials that are useful in fabricating rotary-type earth-boring drill bits, or combinations of any of the foregoing materials. Preferably, any surfaces of bit body 12 that may be exposed during drilling, such as the exterior surfaces of gage pads 28, junk slots 32, bit crown 13, and internal fluid courses 34 (see FIGS. 1 and 3), comprise an erosion- and abrasion-resistant material, such as tungsten carbide. Particulate materials having these characteristics may be hand-packed or adhered to the interior of bit gage mold 68 and the remainder of the bit interior cavity filled with another material.

Following the disposal of particulate core material or materials 74 within bit interior cavity 71, as depicted in FIG. 7C, particulate core material 74 may be vibrated or otherwise compacted to facilitate the substantially complete filling of bit interior cavity 71 with particulate core material 74.

Prior to infiltrating bit crown 13 and particulate core material or materials 74 with an infiltrant material, bit crown mold 64 may be preheated to dissipate or vaporize any resin or other binder material in the particulate-based matrix thereof. Preheating and infiltration may be conducted in a furnace or other heating device, such as an induction coil, as known in the art.

Turning to FIG. 7D, infiltration may be conducted at typical infiltration temperatures, for example, temperatures of from about 950° C. to about 1200° C. or hotter, at which the hardenable liquid infiltrant material 76 has liquified and will imbibe substantially throughout the various particulate-based regions of bit body 12, including bit crown 13.

Preferably, a conventional infiltrant material 76, such as a copper or copper-nickel alloy or a high melting-point non-metallic binder, such as a glass-based material, is employed to infiltrate bit crown 13 and bit body 12. An exemplary copper alloy that is particularly suitable for use in the method of the present invention is disclosed in U.S. Pat. No. 5,000,273, issued to Horton et al., the disclosure of which is hereby incorporated by reference in its entirety. Alternatively, a polymeric binder, such as a polyester or an epoxy resin may be employed to infiltrate the particulate-based bit crown 13 and the remainder of bit body 12. In some instances, infiltration with such material may be carried out at substantially room temperature.

With continued reference to FIG. 7D, a hardenable liquid infiltrant material 76 is placed in contact with the particulate core material 74 disposed in mold cavity 72 and mass infiltrated into the interstices between particles of core material 74 and, preferably, into the interstices of particulate-based bit crown 13, as known in the art. During infiltration, infiltrant material 76 melts and moves throughout the particulate-based regions of core material or materials 74.

Infiltrant material 76 is then permitted to harden and solidify, effectively binding the particles comprising bit body 12 together. As infiltrant material 76 solidifies, it may also bind bit body 12 to any solid structures disposed therein, such as a bit blank or bit shank (not shown), resulting in a single, integral structure. Infiltrant material 76 may also fill any voids or vugs within or on bit body 12. Preferably, infiltrant material 76 also infiltrates bit crown 13 and, thereby, integrates bit crown 13 with the remainder of bit body 12 (see FIG. 1).

Alternatively, bit crown 13 may be infiltrated prior to infiltrating the remainder of bit body 12. Bit crown 13 may subsequently be secured to the remainder of bit body 12 during infiltration by infiltrant material 76 bonding to the material with which bit crown 13 is infiltrated. Alternatively, bit crown 13 may subsequently be secured to the remainder of bit body 12 by mechanical or other known means, such as by the techniques disclosed in U.S. Pat. No. 5,441,121, issued to Tibbitts, the disclosure of which is hereby incorporated by reference in its entirety.

If bit crown 13 includes a central plenum 114 (see FIG. 1A), a heating element may be disposed through central plenum 114 to facilitate a substantially consistent temperature within the substantially hollow region of bit crown 13, such as between inner shell 112 and outer shell 110. Accordingly, the disposal of a heating element through central plenum 114 facilitates substantially consistent cooling of infiltrant material 76 disposed between inner shell 112 and outer shell 110 and, therefore, reduces the likelihood of cracks or other imperfections in the fabricated bit body 12 and the probability of failure.

Bit body 12 and bit gage mold 68 may then be removed from mold casing 60, and bit gage mold 68 and mold inserts 72 removed from bit body 12, as known in the art.

Referring now to FIGS. 8A–8C, another embodiment of the method of fabricating a rotary-type earth-boring drill bit according to the present invention is illustrated. As illustrated in FIG. 8A, a nonwettable, granular material 73' is preferably disposed within the interior hollow portion of bit crown 13 prior to assembly of bit gage mold 68 with bit crown mold 64. Bit crown 13 may then be infiltrated with an infiltrant material 76', which is referred to herein as core material 76' as known in the art, and as explained above in reference to FIGS. 7A–7D. Nonwettable, granular material 73' may then be removed from the interior hollow portion of bit crown 13, and bit gage mold 68 assembled with bit crown mold 64.

As an alternative to the use of layered manufacturing techniques to fabricate bit crown 13, other known techniques may be employed to fabricate bit crown 13 (e.g., casting) as a substantially solid mass of material, rather than as a particulate-based matrix infiltrated with an infiltrant material.

The assembly of mold casing 60, bit crown mold 64, and bit gage mold 68 may then be positioned within a furnace or other known heating apparatus, such as an induction coil, and heated to a sufficient temperature to facilitate the disposal of a molten core material 76' within bit interior cavity 71'.

Core material 76' is preferably a tough and ductile material or an erosion- and abrasion-resistant material, such as has been conventionally employed to fabricate rotary-type earth-boring drill bits. Exemplary core materials 76' include, without limitation, iron, steel, stainless steel, titanium, a titanium alloy, nickel, a nickel alloy, other tough and ductile materials, tungsten, other refractory materials, other erosion- and abrasion-resistant materials, and alloys thereof.

With reference to FIG. 8C, as molten core material 76' is disposed in bit interior cavity 71', core material 76' may melt or tackify the infiltrant material of bit crown 13 and, thereby, adhere or otherwise bond thereto. Thus, as core material 76' solidifies, bit crown 13 and the remainder of bit body 12 become a substantially integral structure.

Alternatively, bit crown 13 may be integrally infiltrated with the remainder of bit body 12 by molten core material 76' as molten core material 76' is disposed within bit interior cavity 71'. Accordingly, infiltration and fabrication of the bit interior and bit gage may occur substantially simultaneously.

With continued reference to FIGS. 8A–8C, molten core material 76' may, however, have a much higher melting temperature than the infiltrant material employed to infiltrate bit crown 13. For example, the infiltrant material may have a melting temperature of about 900° C. to about 1250° C. In contrast, steel has a melting temperature of about 1200° C. to about 1550° C. Thus, if bit crown 13 is infiltrated prior to the disposition of molten core material 76' into bit interior cavity 71', bit crown 13 preferably has a thickness and interior (i.e., hollow portion) surface area that will facilitate the disposal of a quantity of molten core material 76' within the hollow interior thereof, while maintaining the structural integrity of bit crown 13. Accordingly, during the design of bit crown 13, it is preferable to consider the melting temperature of the infiltrant material that is employed to infiltrate bit crown 13, as well as the melting temperature of core material 76'. In addition, the infiltrant and matrix materials of bit crown 13 and core material 76' are preferably compatible, substantially non-reactive, and able to at least mix or, more preferably, alloy proximate the inner surface of bit crown 13. The thickness and mass of bit crown 13, as well as the volume of the interior, hollow region of bit crown 13, and the mass and volume of core material 76' that may be employed therewith, may then be determined in order to fabricate a bit crown 13 that will maintain its structural integrity as molten core material 76' is disposed within bit interior cavity 71'.

Alternatively, layers of molten core material 76' may be sequentially disposed adjacent the surface of the interior, hollow region of bit crown 13, so as to absorb some of the heat from subsequently disposed layers.

As core material 76' may be a tough and ductile material rather than an erosion- and abrasion-resistant material, it may be necessary to apply an abrasion- and erosion-resistant material on some of the external surfaces of bit body 12, such as the gage pads, junk slots, and internal fluid courses thereof. When applied to external surfaces of a bit, such abrasion- and erosion-resistant materials are typically termed "hard-facing". Referring again to FIG. 8C, hard-facing 78' may be disposed within bit interior cavity 71' as known in the art, such as by the methods disclosed in U.S. Pat. No. 4,884,477, issued to Smith et al. on Dec. 5, 1989, and in U.S. Pat. No. 5,090,491, issued to Tibbitts et al. on Feb. 25, 1992, the disclosures of each of which are hereby incorporated by reference in their entireties. As disclosed above, a hard-facing 78' of erosion- and abrasion-resistant material is preferably disposed on the surfaces of bit interior cavity 71', such as the surfaces of cavity 70' and mold insert 74', prior to the disposal of core material 76' in bit interior cavity 71'. Alternatively, hard-facing 78' may be applied to the desired external surfaces of bit body 12, as known in the art, following the fabrication of bit body 12.

Although the foregoing description contains many specifics and examples, these should not be construed as limiting the scope of the present invention, but merely as providing illustrations of some of the presently preferred embodiments. Similarly, other embodiments of the invention may be devised which do not depart from the spirit or scope of the present invention. The scope of this invention is, therefore, indicated and limited only by the appended claims and their legal equivalents, rather than by the foregoing description. All additions, deletions and modifications to the invention as disclosed herein and which fall within the meaning of the claims are to be embraced within their scope.

What is claimed is:

1. A rotary-type earth-boring drill bit comprising:
   a bit body having a first longitudinal extent and including:
   a bit crown having a second longitudinal extent less than said first longitudinal extent and comprising particulate material configured as a shell having a substantially hollow interior portion; and
   a core material including a first portion disposed within said substantially hollow interior portion of said bit crown and secured to said bit crown and a second portion extending longitudinally beyond said second longitudinal extent of said bit crown, said second portion of said core material forming at least a portion of an exterior, longitudinally extending surface of said bit body at a bit gage region located longitudinally adjacent said bit crown.

2. The drill bit of claim 1, wherein said core material comprises a particulate core material.

3. The drill bit of claim 2, wherein said particulate core material and said particulate material of said bit crown are each infiltrated with an infiltrant material.

4. The drill bit of claim 3, wherein said particulate material of said bit crown and said particulate core material are infiltrated with a common infiltrant material.

5. The drill bit of claim 3, wherein said infiltrant material comprises copper or a copper alloy.

6. The drill bit of claim 2, wherein said particulate material of said bit crown and said particulate core material comprise different materials.

7. The drill bit of claim 1, wherein said particulate material of said bit crown comprises a plurality of contiguous, superimposed layers of particulate material.

8. The drill bit of claim 1, wherein said particulate material of said bit crown comprises an erosion- and abrasion-resistant material.

9. The drill bit of claim 8, wherein said erosion- and abrasion-resistant material comprises tungsten carbide.

10. The drill bit of claim 1, wherein said particulate material of said bit crown and said core material are mutually bonded by a hardened, formerly liquid material extending into said bit crown and between particles thereof.

11. The drill bit of claim 1, wherein said core material comprises at least one of steel, stainless steel, iron, titanium, a titanium alloy, nickel, a nickel alloy, tungsten carbide and tungsten.

12. The drill bit of claim 1, wherein said core material comprises a tough and ductile material.

13. The drill bit of claim 1, wherein surfaces of said bit gage region substantially extend to a gage diameter of said bit body and comprise a hard-facing material.

14. The drill bit of claim 13, wherein said hard-facing material comprises an erosion- and abrasion-resistant material.

15. The drill bit of claim 14, wherein said erosion- and abrasion-resistant material comprises tungsten carbide.

16. The drill bit of claim 1, wherein said bit crown comprises a particulate material bonded in a matrix comprising another material.

17. The drill bit of claim 1, further comprising an inner shell defining a plenum within said bit body and at least one internal fluid course extending from said plenum to an outer surface of said bit crown, some of said core material being located between at least a portion of said bit crown and at least a portion of said inner shell.

18. The drill bit of claim 17, wherein said bit crown and said inner shell are contiguous with one another.

19. The drill bit of claim 17, wherein said plenum is substantially centrally disposed within said bit crown.

20. The drill bit of claim 17, wherein said plenum communicates with a passageway of a bit shank disposed adjacent to said inner shell.

21. The drill bit of claim 17, wherein said particulate material of said bit crown comprises a plurality of contiguous, mutually secured layers of particulate material.

22. The drill bit of claim 17, wherein said bit crown comprises a particulate material bonded in a matrix comprising another material.

23. The drill bit of claim 22, wherein said particulate material of said bit crown comprises tungsten carbide.

24. The drill bit of claim 17, wherein said core material comprises at least one of iron, steel, stainless steel, titanium, a titanium alloy, nickel, a nickel alloy, tungsten carbide and tungsten.

25. The drill bit of claim 17, wherein said core material comprises tungsten carbide.

26. The drill bit of claim 17, wherein said inner shell, said core material and said bit crown comprise an infiltrant material.

27. The drill bit of claim 26, wherein said infiltrant material comprises copper or a copper alloy.

28. The drill bit of claim 17, wherein said inner shell comprises a particulate material.

29. The drill bit of claim 28, wherein said core material comprises a particulate material.

30. The drill bit of claim 28, wherein particulate materials of said inner shell, said core material and said bit crown are mutually bonded with a hardened infiltrant material.

31. The drill bit of claim 28, wherein said particulate material of said inner shell comprises a plurality of contiguous, mutually secured layers of particulate material.

32. The drill bit of claim 31, wherein said core material is bonded to said particulate material of said bit crown and said particulate material of said inner shell.

33. The drill bit of claim 17, wherein said core material comprises a particulate material.

34. The drill bit of claim 33, wherein the particulate material of said bit crown and said particulate core material comprise different materials.

* * * * *

UNITED STATES PATENT AND TRADEMARK OFFICE
CERTIFICATE OF CORRECTION

PATENT NO.     : 6,454,030 B1
DATED          : September 24, 2002
INVENTOR(S)    : Sidney L. Findley, Trent N. Butcher and Gordon A. Tibbits It is certified that error appears in the above-identified patent and that said Letters Patent is hereby corrected as shown below:

<u>Column 1,</u>
Line 24, change "rotary" to -- "rotary --
Line 25, change "bits" to -- bits" --
Line 25, change "drag bits" to -- "drag bits" --

<u>Column 9,</u>
Line 15, change "interior bit" to -- interior/bit --
Line 51, change "trimmers (not shown) in FIG. 3" to -- trimmers (not shown in FIG. 3) --

<u>Column 10,</u>
Line 10, change "14" to -- 14' --
Lines 13-14, change "earth boring" to -- earth-boring --

<u>Column 11,</u>
Line 22, change "208b" to -- 208b' --

<u>Column 12,</u>
Line 16, change "bit model" to -- bit crown model --

Signed and Sealed this

Fourth Day of November, 2003

JAMES E. ROGAN
*Director of the United States Patent and Trademark Office*